US012574709B2

(12) United States Patent
Sebire et al.

(10) Patent No.: US 12,574,709 B2
(45) Date of Patent: Mar. 10, 2026

(54) MULTICAST/BROADCAST SUPPORT IN DUAL-CONNECTIVITY

(71) Applicant: Nokia Technologies Oy, Espoo (FI)

(72) Inventors: Benoist Sebire, Tokyo (JP); Jing He, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 485 days.

(21) Appl. No.: 18/041,017

(22) PCT Filed: Sep. 7, 2020

(86) PCT No.: PCT/CN2020/113818
§ 371 (c)(1),
(2) Date: Feb. 8, 2023

(87) PCT Pub. No.: WO2022/047794
PCT Pub. Date: Mar. 10, 2022

(65) Prior Publication Data
US 2023/0276203 A1 Aug. 31, 2023

(51) Int. Cl.
*H04W 4/00* (2018.01)
*H04W 4/08* (2009.01)
(52) U.S. Cl.
CPC ..................................... *H04W 4/08* (2013.01)
(58) Field of Classification Search
CPC ......... H04W 4/08; H04W 76/20; H04W 4/06; H04W 4/50; H04W 76/40
See application file for complete search history.

(56) References Cited

U.S. PATENT DOCUMENTS

| | | | |
|---|---|---|---|
| 10,447,489 | B2 | 10/2019 | Sharma et al. |
| 2013/0294320 | A1 | 11/2013 | Jactat et al. |

(Continued)

FOREIGN PATENT DOCUMENTS

| | | |
|---|---|---|
| CN | 101360261 A | 2/2009 |
| CN | 105684473 A | 6/2016 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

(Continued)

*Primary Examiner* — Omoniyi Obayanju
(74) *Attorney, Agent, or Firm* — Carter, DeLuca & Farrell LLP

(57) ABSTRACT

Disclosed are embodiments of methods and apparatuses for supporting Multicast and Broadcast Services (MBSs) in a Dual-Connectivity (DC) scenario. A method implemented at a terminal device may comprise receiving from a first base station (BS) a command to report interested MBSs, sending information of interested MBSs to the first BS, receiving from the first BS configuration of at least one of the interested MBSs and configuration of a second BS providing the at least one interested MBS, setting up or modifying connection with the second BS based on the configuration of the second BS, and receiving the at least one interested MBS from the second BS based on the configuration of the at least one interested MBS.

6 Claims, 9 Drawing Sheets

100

BS 110 (MN)
PCell 111  SCell 113 ...
MCG 115

BS 120 (SN)
PSCell 121  SCell 123 ...
SCG 125

UE 130

(56) References Cited

U.S. PATENT DOCUMENTS

| | | | | |
|---|---|---|---|---|
| 2016/0249259 | A1 | 8/2016 | Park et al. | |
| 2016/0380779 | A1* | 12/2016 | Sharma | H04W 72/1215 |
| | | | | 370/312 |
| 2018/0139665 | A1* | 5/2018 | Park | H04W 36/0061 |
| 2018/0160342 | A1 | 6/2018 | Park et al. | |
| 2018/0199163 | A1 | 7/2018 | Chen et al. | |
| 2018/0206080 | A1 | 7/2018 | Chen et al. | |

FOREIGN PATENT DOCUMENTS

| | | | |
|---|---|---|---|
| CN | 107211333 | A | 9/2017 |
| CN | 109417733 | A | 3/2019 |
| CN | 110546967 | A | 12/2019 |
| WO | 2017/082660 | A1 | 5/2017 |
| WO | 2017/171784 | A1 | 10/2017 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; Evolved Universal Terrestrial Radio Access (E-UTRA) and NR; Multi connectivity; Stage 2 (Release 16)", 3GPP TS 37.340, V16.1.0, Mar. 2020, pp. 1-74.

"New Work Item on NR support of Multicast and Broadcast Services", 3GPP TSG RAN Meeting #86, RP-193248, Agenda Item: 9.1.2, Huawei, Dec. 9-12, 2019, 5 pages.

"Mechanisms to enable simultaneous operation of NR Unicast + LTE MBMS", 3GPP TSG RAN WG2 #110e, R2-2004535, Agenda item: 6.20.1.2, Qualcomm Incorporated, Jun. 1-12, 2020, pp. 1-5.

"3rd Generation Partnership Project; Technical Specification Group Services and System Aspects; Study on architectural enhancements for 5G multicast-broadcast services (Release 17)", 3GPP TR 23.757, V0.4.0, Jun. 2020, pp. 1-157.

"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.

International Search Report and Written Opinion received for corresponding Patent Cooperation Treaty Application No. PCT/CN2020/113818, dated May 26, 2021, 10 pages.

"Initial considerations of NR multicast", 3GPP TSG-RAN WG2 Meeting #111 electronic, R2-2007412, Agenda item: 8.1.1, CMCC, Aug. 17-28, 2020, 6 pages.

"Views on NR Multicast/Broadcast in Rel-17", 3GPP TSG-RAN Meeting #85, RP-191899, Agenda Item: 8.1.4, Vivo, Sep. 16-20, 2019, 4 pages.

Extended European Search Report received for corresponding European Patent Application No. 20952036.0, dated Mar. 12, 2024, 15 pages.

Office Action received for corresponding Chinese Patent Application No. 202080103824.5, dated Mar. 29, 2024, 10 pages of Office Action and no page of translation available.

* cited by examiner

100

Figure 4:
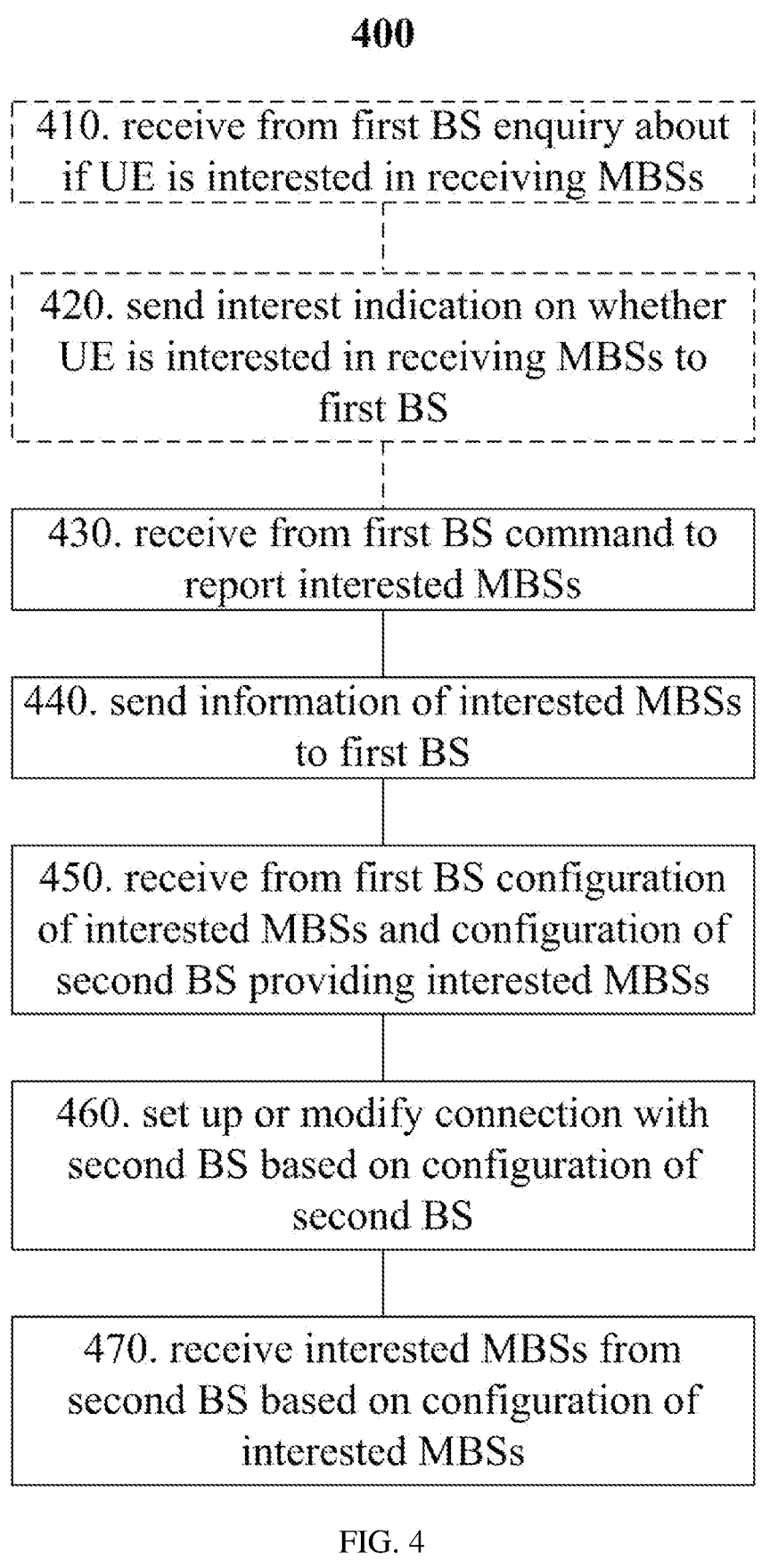

400

410. receive from first BS enquiry about if UE is interested in receiving MBSs 420. send interest indication on whether UE is interested in receiving MBSs to first BS 430. receive from first BS command to report interested MBSs 440. send information of interested MBSs to first BS 450. receive from first BS configuration of interested MBSs and configuration of second BS providing interested MBSs 460. set up or modify connection with second BS based on configuration of second BS 470. receive interested MBSs from second BS based on configuration of interested MBSs

610. send enquiry about if UE is interested in receiving MBSs to UE 620. receive from UE interest indication on whether UE is interested in receiving MBSs 630. send command to report interested MBSs to UE 640. receive from UE information of interested MBSs 650. send SN addition or modification request comprising the information of interested MBSs to second BS 660. receive from second BS ACK to SN addition or modification request 670. send configuration of interested MBSs and configuration of second BS to UE

MULTICAST/BROADCAST SUPPORT IN DUAL-CONNECTIVITY

RELATED APPLICATION

This application was originally filed as PCT Application No. PCT/CN2020/113818, filed on Sep. 7, 2020, which is incorporated herein by reference in its entirety.

TECHNICAL FIELD

Various example embodiments described herein generally relate to communication technologies, and more particularly, to methods and apparatuses capable of supporting Multicast and Broadcast Services (MBSs) in a Dual-Connectivity (DC) architecture.

BACKGROUND

Certain abbreviations that may be found in the description and/or in the figures are herewith defined as follows:
BS Base Station
DC Dual Connectivity
E-UTRA Evolved Universal Terrestrial Radio Access
eNB E-UTRAN NodeB
gNB next Generation NodeB
LTE Long Term Evolution
MBS Multicast and Broadcast Service
MCG Master Cell Group
MN Master Node
NR New Radio
PCell Primary Cell
PSCell Primary Secondary Cell
PTM Point to Multipoint
PTP Point to Point
RRC Radio Resource Control
SCell Secondary Cell
SCG Secondary Cell Group
SIB System Information Block
SN Secondary Node
TMGI Temporary Mobile Group Identity
UE User Equipment Multicast and Broadcast Service (MBS) has been introduced in the Long Term Evolution (LTE) wireless communication system as a mechanism by which data (content) of a service may be transmitted from the network to a group of user equipments (UEs) via a common bearer (e.g. an MBS bearer). Compared to separate dedicated bearer for each UE receiving the service, the MBS service can reduce the overall network load. It is expectable that the MBS service would also be supported in the 5G New Radio (NR) wireless communication system in the future.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a method implemented at a terminal device is provided. The method may comprise receiving from a first network device a command to report interested MBS services, and sending information of one or more interested MBS services to the first network device. The method may further comprise receiving from the first network device configuration of at least one of the one or more interested MBS services and configuration of a second network device providing the at least one of the one or more interested MBS services, and setting up or modifying connection with the second network device based on the configuration of the second network device. Thus, the terminal device is simultaneously connected to both the first network device and the second network device. The method may further comprise receiving the at least one of the one or more interested MBS services from the second network device based on the configuration of the at least one of the one or more interested MBS services.

In a second aspect, an example embodiment of a method implemented at a network device is provided. The method may comprise sending a command to report interested MBS services to a terminal device, and receiving from the terminal device information of one or more interested MBS services. The network device may operate as a master node (MN) for the terminal device. The method may further comprise sending a secondary node (SN) addition or modification request comprising the information of one or more interested MBS services to an additional network device. The additional network device may operate or be selected to operate as an SN for the terminal device. The method may further comprise receiving from the additional network device acknowledgement to the SN addition or modification request. The acknowledgement to the SN addition or modification request may comprise configuration of at least one of the one or more interested MBS services and configuration of the additional network device. The method may further comprise sending the configuration of the at least one of the one or more interested MBS services and the configuration of the additional network device to the terminal device.

In a third aspect, an example embodiment of a method implemented at a network device is provided. The method may comprise receiving a SN addition or modification request from an additional network device. The SN addition or modification request may comprise information of one or more MBS services a terminal device is interested in. The method may further comprise sending acknowledgement to the SN addition or modification request to the additional network device. The acknowledgement to the SN addition or modification request may comprise configuration of at least one of the one or more interested MBS services and configuration of the network device.

In a fourth aspect, an example embodiment of a terminal device is provided. The terminal device may comprise at least one processor and at least one memory including computer program code. The at least one memory and the computer program code may be configured to, with the at least one processor, cause the terminal device to receive from a first network device a command to report interested MBS services, send information of one or more interested MBS services to the first network device, receive from the first network device configuration of at least one of the one or more interested MBS services and configuration of a second network device providing the at least one of the one or more interested MBS services, set up or modify connection with the second network device based on the configuration of the second network device so that the terminal device is simultaneously connected to both the first network device and the second network device, and receive the at least one of the one or more interested MBS services from the second network device based on the configuration of the at least one of the one or more interested MBS services.

In a fifth aspect, an example embodiment of a network device is provided. The network device may comprise at least one processor and at least one memory including computer program code. The at least one memory and the computer program code may be configured to, with the at least one processor, cause the network device to send a command to report interested MBS services to a terminal device, receive from the terminal device information of one or more interested MBS services, the network device operating as a MN for the terminal device, send a SN addition or modification request comprising the information of one or more interested MBS services to an additional network device, the additional network device operating or being selected to operate as an SN for the terminal device, receive from the additional network device acknowledgement to the SN addition or modification request, the acknowledgement to the SN addition or modification request comprising configuration of at least one of the one or more interested MBS services and configuration of the additional network device, and send the configuration of the at least one of the one or more interested MBS services and the configuration of the additional network device to the terminal device.

In a sixth aspect, an example embodiment of a network device is provided. The network device may comprise at least one processor and at least one memory including computer program code. The at least one memory and the computer program code may be configured to, with the at least one processor, cause the network device to receive a SN addition or modification request from an additional network device, the SN addition or modification request comprising information of one or more MBS services a terminal device is interested in, and send acknowledgement to the SN addition or modification request to the additional network device, the acknowledgement to the SN addition or modification request comprising configuration of at least one of the one or more interested MBS services and configuration of the network device.

In a seventh aspect, an example embodiment of an apparatus for supporting multicast and broadcast services (MBSs) at a terminal device is provided. The apparatus may comprise means for receiving from a first network device a command to report interested MBS services, means for sending information of one or more interested MBS services to the first network device, means for receiving from the first network device configuration of at least one of the one or more interested MBS services and configuration of a second network device providing the at least one of the one or more interested MBS services, means for setting up or modifying connection with the second network device based on the configuration of the second network device so that the terminal device is simultaneously connected to both the first network device and the second network device, and means for receiving the at least one of the one or more interested MBS services from the second network device based on the configuration of the at least one of the one or more interested MBS services.

In an eighth aspect, an example embodiment of an apparatus for supporting multicast and broadcast services (MBSs) at a network device is provided. The apparatus may comprise means for sending a command to report interested MBS services to a terminal device, means for receiving from the terminal device information of one or more interested MBS services, the network device operating as a MN for the terminal device, means for sending a SN addition or modification request comprising the information of one or more interested MBS services to an additional network device, the additional network device operating or being selected to operate as an SN for the terminal device, means for receiving from the additional network device acknowledgement to the SN addition or modification request, the acknowledgement to the SN addition or modification request comprising configuration of at least one of the one or more interested MBS services and configuration of the additional network device, and means for sending the configuration of the at least one of the one or more interested MBS services and the configuration of the additional network device to the terminal device.

In a ninth aspect, an example embodiment of an apparatus for supporting multicast and broadcast services (MBSs) at a network device is provided. The apparatus may comprise means for receiving an SN addition or modification request from an additional network device, the SN addition or modification request comprising information of one or more MBS services a terminal device is interested in, and means for sending acknowledgement to the SN addition or modification request to the additional network device, the acknowledgement to the SN addition or modification request comprising configuration of at least one of the one or more interested MBS services and configuration of the network device.

In a tenth aspect, an example embodiment of a computer readable medium is provided. The computer readable medium may have instructions stored thereon. The instructions, when executed by at least one processor of a terminal device, may cause the terminal device to perform a method provided in the above first aspect.

In an eleventh aspect, an example embodiment of a computer readable medium is provided. The computer readable medium may have instructions stored thereon. The instructions, when executed by at least one processor of a network device, may cause the network device to perform a method provided in the above second aspect.

In a twelfth aspect, an example embodiment of a computer readable medium is provided. The computer readable medium may have instructions stored thereon. The instructions, when executed by at least one processor of a network device, may cause the network device to perform a method provided in the above third aspect.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

FIG. 4 illustrates a flow chart of a method for supporting MBS services at a terminal device in accordance with some example embodiments.

FIG. 6 illustrates a flow chart of a method for supporting MBS services at a network device in accordance with some example embodiments.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which a terminal device can access the network or receive services. The network device may be commonly referred to as a base station. The term "base station" used herein can represent a node B (NodeB or NB), an evolved node B (eNodeB or eNB), or a gNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal (MT), a mobile station (MS), a subscriber station (SS), a portable subscriber station (PSS), an access terminal (AT), a computer, a wearable device, an on-vehicle communication device, a machine type communication (MTC) device, a D2D communication device, a V2X communication device, a sensor and the like. The term "terminal device" can be used interchangeably with a UE, a user terminal, a mobile terminal, a mobile station, or a wireless device.

Figure 1:
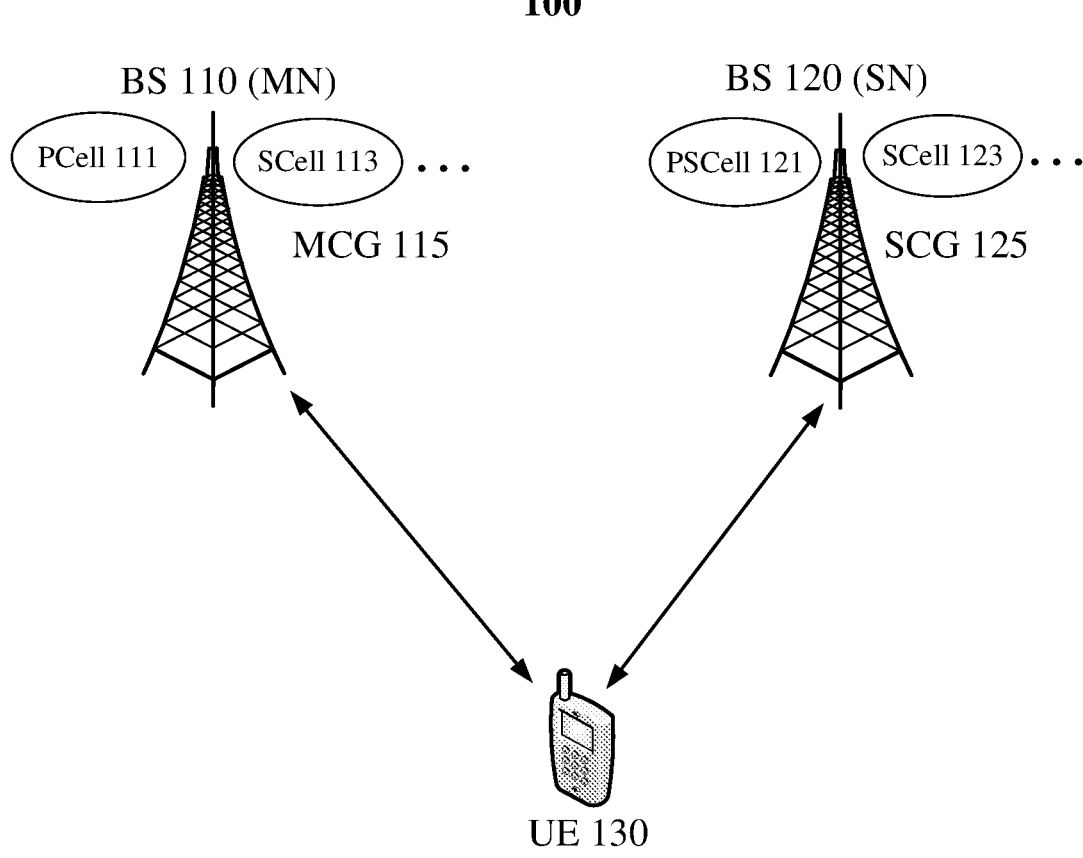
FIG. 1 illustrates a schematic diagram of an example communication system in which embodiments of the present disclosure can be implemented.

FIG. 1 illustrates a schematic diagram of an example communication system 100 in which embodiments of the present disclosure can be implemented. Referring to FIG. 1, the communication system 100 may include a first network device or base station (BS) 110, a second network device or base station (BS) 120, and a terminal device or user equipment (UE) 130. The UE 130 may be configured to operate in a Dual Connectivity (DC) mode so that it is connected to both the first BS 110 and the second BS 120. The UE 130, when operating in the DC mode, may simultaneously receive and transmit data on a plurality of component carriers from serving cells of the first BS 110 and the second BS 120. Here, it is assumed that the first BS 110 acts as a master node (MN) which has Radio Resource Control (RRC) connection with the UE 130 and provides the UE 130 with a control plane connection to a core network (not shown), and the second BS 120 acts as a secondary node (SN) which provides additional resources to the UE 130. The serving cells of the MN 110 may be referred to as a master cell group (MCG) 115, which includes one primary cell (PCell) 111 and optionally one or more secondary cells (SCells) 113 (one is shown in FIG. 1). The serving cells of the SN 120 may be referred to as a secondary cell group (SCG) 125, which includes one primary secondary cell (PSCell) 121 and optionally one or more secondary cells (SCells) 123 (one is shown in FIG. 1). In a case of multi-radio dual-connectivity (MR-DC), one of the MN 110 and the SN 120 may be a 5G base station gNB which provides NR access to the network, and the other may be either an LTE base station eNB which provides E-UTRA access to the network or a 5G base station gNB which provides NR access to the network.

However, so far it is still not clear how MBS services can be supported in the DC scenario, especially in a case where the MN does not provide any MBS service nor broadcast any MBS-related system information block (SIB), or the MN cannot provide the MBS service that the UE is interested in, but the SN possibly can. Hereinafter, embodiments of methods and apparatuses capable of supporting MBS services in the DC scenario would be discussed in detail with reference to the accompanying drawings.

Figure 2:
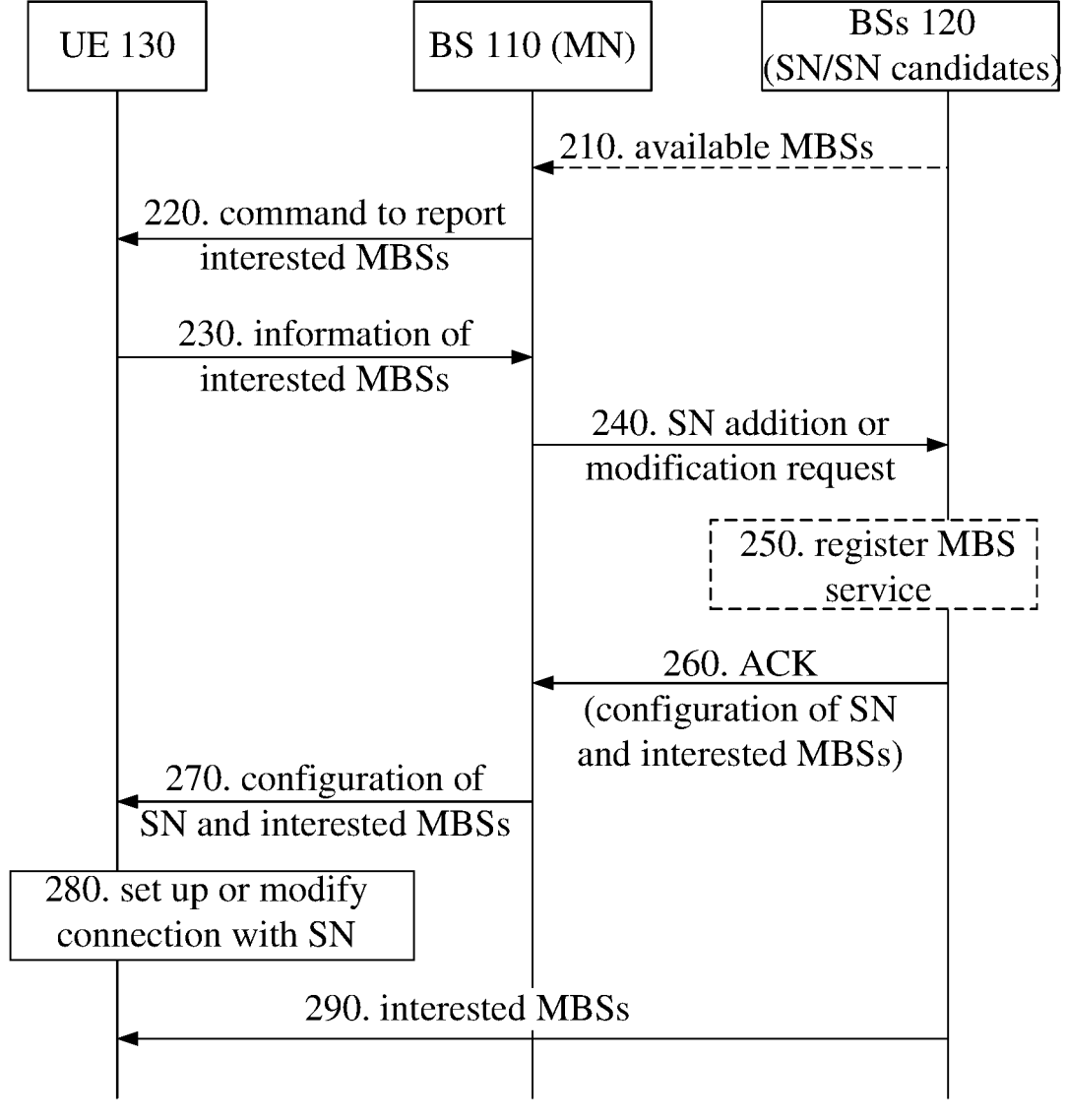
FIG. 2 illustrates an interaction diagram of operations for providing multicast and broadcast services (MBSs) in a dual-connectivity (DC) scenario according to some embodiments of the present disclosure.

FIG. 2 illustrates an interaction diagram of operations for providing MBS services in the DC scenario according to some embodiments of the present disclosure. At the beginning of the procedure shown in FIG. 2, the UE 130 may be in an idle or inactive state, connected with the first BS 110, or already connected in the DC mode with both the first BS 110 as an MN and the second BS 120 as an SN. In some embodiments, the first BS 110 may have context of the UE 130 and thus is aware of capability of the UE 130, including DC capability and MBS receiving capability.

Referring to FIG. 2, at a step 210, the first BS 110 may collect available MBS services from a plurality of neighboring second BSs 120. The plurality of neighboring second BSs 120 may include SN candidates for the UE 130, and may also include the SN for the UE 130 if the UE 130 is already in DC configuration. The available MBS services may include ongoing MBS services that are being provided in serving cells of the neighboring second BSs 120, and MBS services that have been prepared and ready for service in serving cells of the neighboring second BSs 120. By the step 210, the first BS 110 may maintain a list of available MBS services and identities of cells that are capable of providing the MBS services.

In some embodiments, the step 210 may be omitted, and the first BS 110 may be pre-configured with information of available MBS services from the neighboring second BSs 120. For example, the network operator may maintain a list of available MBS services from neighboring base stations at the first BS 110. In some embodiments, the step 210 may be omitted and the first BS 110 does not need to know available MBS services from the neighboring second BSs 120.

In a step 220, the first BS 110 may command the UE 130 to report interested MBS services. In some embodiments, the UE 130 may be in the idle or inactive state, and the first BS 110 may send the command to report interested MBS services to the UE 130 by for example broadcasting a system information block (SIB) such as SystemInformationBlock-Type15. In some embodiments, the UE 130 may be already connected with the first BS 110 either in the DC configuration or not, and the first BS 110 may send the command to the UE 130 by the SIB or RRC signaling for example an RRC reconfiguration message.

In some embodiments, the command to report interested MBS services may include a list of MBS services available to the UE 130 at SN and/or SN candidates (i.e., the neighboring second BSs 120) for the UE 130. The MBS services may be represented by for example a temporary mobile group identity (TMGI). Thus, the UE 130 can know available MBS services without decoding SIBs from neighboring base stations. Optionally, the command may also include identities of cells of the neighboring second BSs 120 that are capable of providing the MBS services. In the command, an MBS service may be associated with one or more cells of one or more base stations that are capable of providing the MBS service.

In some embodiments, the command to report interested MBS services may not include any MBS service available to the UE 130, and it would be beneficial for minimizing the downlink overhead.

In a step 230, the UE 130 may send information of one or more MBS services that the UE 130 is interested in to the first BS 110. If the UE 130 is in the idle state when it receives the command to report interested MBS services from the first BS 110, the UE 130 may set up an RRC connection with the first BS 110 by a random access procedure and then send the information of one or more interested MBS services to the first BS 110. The information of one or more interested MBS services may be sent by RRC signaling for example a RRC reconfiguration complete message responsive to the RRC reconfiguration message received from the first BS 110, an MBS interest indication message responsive to the SIB15, or a measurement report.

In some embodiments, the UE 130 may select one or more interested MBS services from the available MBS services included in the command to report interested MBS services received from the first BS 110. In some embodiments, the UE 130 may also select one or more interested MBS services that are not included in the command received from the first BS 110. For example, if the UE 130 is interested in an MBS service but the MBS service is not included in the list of available MBS services received from the first BS 110, the UE 130 may select the interested MBS service even if it is currently unavailable. In some embodiments, the command to report interested MBS services received from the first BS 110 may not include any available MBS service, and the UE 130 can select interested MBS services from a pre-registered and stored list of MBS services inside UE.

The information of one or more interested MBS services may include a temporary mobile group identity (TMGI) of the interested MBS services. Optionally, if one or more of the interested MBS services are selected from the list of available MBS services, the information of one or more interested MBS services may also include an identity of one or more cells of the SN and/or SN candidates (i.e., the neighboring second BSs 120) that are capable of providing the available MBS services. The cell identities may be associated with the TMGI of a corresponding interested MBS service.

When the first BS 110 receives the information of one or more interested MBS services from the UE 130, the first BS 110 may initiate an SN addition or modification procedure to ensure that the UE 130 is able to receive the interested MBS services. In a step 240, the first BS 110 may send a SN addition or modification request to one of the neighboring second BSs 120 that is selected as the SN for the UE 130 or already operates as the SN of the UE 130. For example, if the UE 130 is not configured in the DC mode, the first BS 110 may select one of the neighboring second BSs 120 as the SN of the UE 130 based on the interested MBS services and measurement results received from the UE 130. In particular, the first BS 110 may select one of the neighboring second BSs 120 that has good (e.g., above a predetermined threshold) channel quality with the UE 130 and is able to provide the interested MBS services for the UE 130 as the SN of the UE 130. If the interested MBS services are not selected from the list of available MBS services and are currently unavailable at the neighboring second BSs 120, the first BS 110 may select the SN based on the measurement results, as in the legacy system. Then, the first BS 110 may send an SN addition request to the selected second BS 120 in the step 240 so as to add the second BS 120 as the SN for the UE 130.

In some embodiments, the UE 130 may be already in the DC configuration with the first BS 110 as the MN and one of the neighboring second BSs 120 as the SN, but the serving cells of the current SN cannot provide the one or more MBS services that the UE 130 is interested in. In such a case, the first BS 110 may decide to modify or change the current SN. In some embodiments, if the one or more interested MBS services may be provided for example by another cell of the current SN that is not included in the SCG 125, the first BS 110 may send in the step 240 an SN modification request to the one of the neighboring second BS 120 that acts as the current SN to add the another cell into the SCG 125 and, if necessary, to release one current serving cell in the SCG 125. In some embodiments, if the one or more interested MBS services are provided for example by one or more cells of an SN candidate (another neighboring second BS 120 different from the current SN), the first BS 110 may send in the step 240 an SN addition request to the SN candidate that provides the one or more interested MBS services to change the SN for the UE 130 from the current (source) SN to the (target) SN candidate.

In some embodiments, the SN addition or modification request may include information of the one or more interested MBS services received from the UE 130 in the step 230. For example, the information of the one or more interested MBS services may include a temporary mobile group identity (TMGI) of the interested MBS services. If the interested MBS services are selected from the list of available MBS services that are provided by cells of neighboring second BSs 120, the information of the one or more interested MBS services may also include identities of the cells that provide the interested MBS services. It would be appreciated that the SN addition or modification request may also include for example MCG configuration, UE capability and/or UE capability coordination result, the latest measurement results for the SCG cell(s) or the like that are necessary for addition or modification of the SN and SN serving cells.

When the second BS 120, which is selected by the first BS 110 as the SN for the UE 130 or is operating as the SN of the UE 130, receives the SN addition or modification request, the second BS 120 may allocate or modify resources for the UE 130. The second BS 120 may decide at least a primary secondary cell (PSCell) for the UE 130. If one of cells of the second BS 120 can provide the interested MBS services included in the SN addition request or modification request, the second BS 120 may take the one of cells as the PSCell for the UE 130. If the interested MBS services include an MBS service that is not available at the second BS 120, the second BS 120 may register the MBS service for the UE 130 based on information of the unavailable MBS service received from the first BS 110 in a step 250. In some embodiments, the second BS 120 may register the MBS service in its PSCell 121. If the interested MBS services include an MBS service that is available at a SCell of the second BS 120, the second BS 120 may also register the MBS service in its PSCell 121. By doing so, all the interested MBS services may be provided from the PSCell 121 to the UE 130. In some embodiments, the second BS 120 may also register the unavailable MBS service in its SCell 123 so that the interested MBS services may be provided to the UE 130 from the PSCell 121 and one or more SCells 123, respectively. It would be appreciated that in some embodiments the second BS 120 may not be able to provide all the interested MBS services to the UE 130.

Then in a step 260, the second BS 120 may send an SN addition or modification request acknowledgement to the first BS 110. The SN addition or modification request acknowledgement may include resource configuration of the second BS 120, and configuration of at least one of the one or more interested MBS services that the second BS 120 is able to provide. In some embodiments, the configuration of the at least one interested MBS service may include configuration of multicast control channel (MCCH) and multicast transport channel (MTCH) for the MBS service.

When the first BS 110 receives the SN addition or modification request acknowledgement from the second BS 120, the first BS 110 may forward the configuration of the second BS 120 and the configuration of the at least one of the one or more interested MBS services to the UE 130 in a step 270. For example, the configuration of the second BS 120 and the at least one interested MBS service may be sent by an RRC reconfiguration message. In some embodiments, the first BS 110 may also send a SN release request to the current SN of the UE 130 for handover from the current (source) SN to the new selected (target) SN.

Next, the UE 130 may apply the configuration of the second BS 120 to set up or modify connection with the second BS 120 in a step 280. For example, the UE 130 may be configured with a PSCell and optionally one or more SCells associated with the second BS 120 that provide the interested MBS services. For each serving cell (PSCell or SCell) of the second BS 120, the UE 130 may be configured with a bandwidth part(s) (BWP) that matches a frequency on which the MBS services are transmitted in the cell. Thus, the UE 130 is simultaneously connected to both the first BS 110 and the second BS 120. The first BS 110 operates as the MN for the UE 130, and the second BS 120 operates as the SN for the UE 130.

In a step 290, the UE 130 may receive the least one of the one or more interested MBS services from the second BS 120 that acts as the SN for the UE 130, based on the configuration of the at least one of the one or more interested MBS services. The at least one MBS service may be transmitted by point to point (PTP) transmissions or point to multipoint (PTM) transmissions. As the UE 130 has received the configuration of the at least one interested MBS service, it does not need to decode SIBs related to the MBS service from the second BS 120. In the embodiments, MBS services are supported in the DC architecture. Even if the MN cannot provide any MBS service nor broadcast any MBS-related SIB, or the MN cannot provide the MBS service that the UE is interested in, the UE can receive MBS services from the SN.

Figure 3:
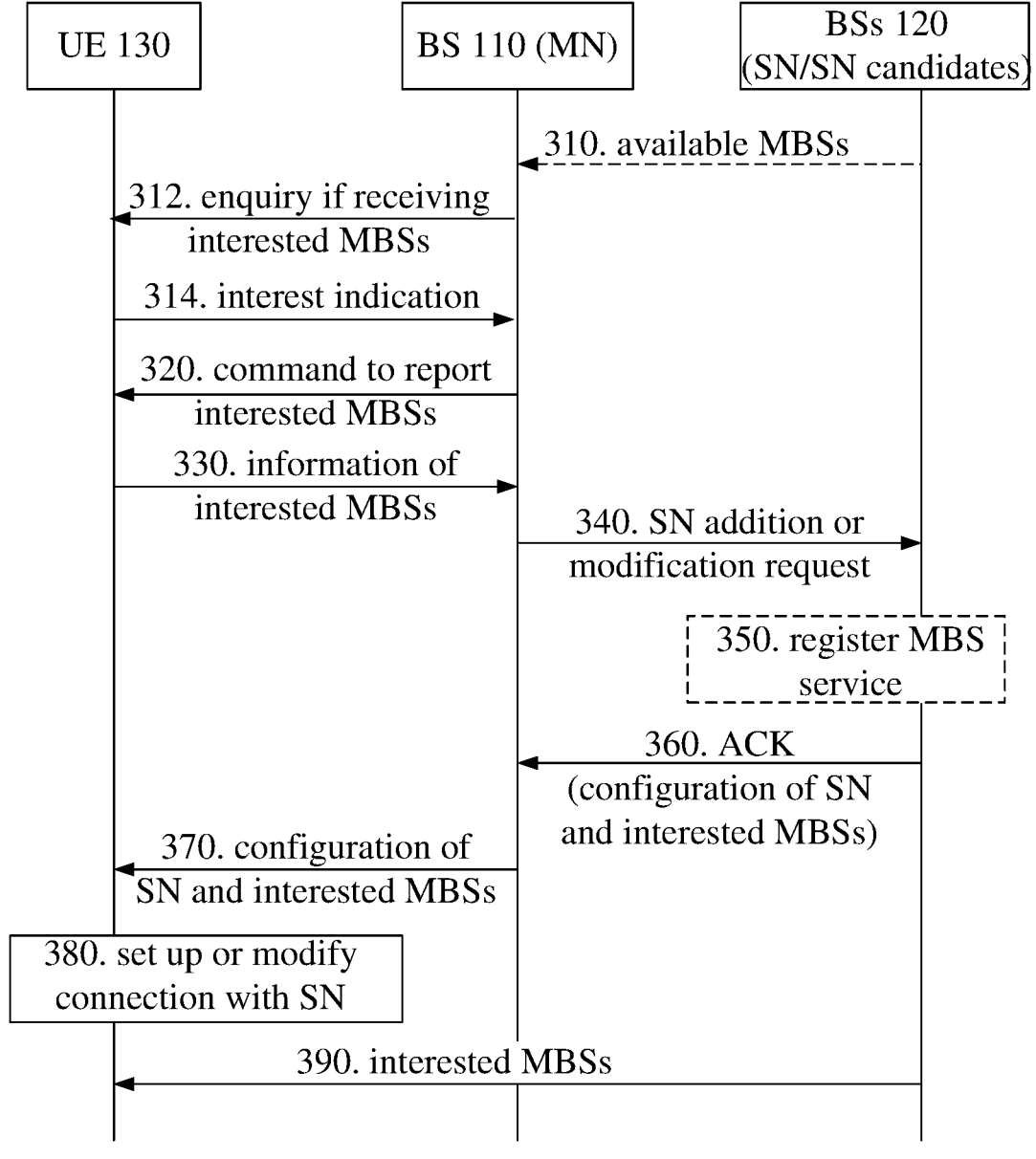
FIG. 3 illustrates an interaction diagram of operations for providing MBS services in a DC scenario according to some embodiments of the present disclosure.

FIG. 3 illustrates an interaction diagram of operations for providing MBS services in a DC scenario according to some embodiments of the present disclosure. The procedure shown in FIG. 3 includes some steps that are similar to those shown in FIG. 2, which are denoted with similar numerals and will be described briefly below. The below description will focus on steps different from those shown in FIG. 2.

Referring to FIG. 3, at a step 310, the first BS 110 may collect available MBS services from a plurality of neighboring second BSs 120. The plurality of neighboring second BSs 120 may include SN candidates for the UE 130, and may also include the SN for the UE 130 if the UE 130 is already in DC configuration. The available MBS services may include ongoing MBS services that are being provided in serving cells of the neighboring second BSs 120, and MBS services that have been prepared and ready for service in serving cells of the neighboring second BSs 120. By the step 310, the first BS 110 may maintain a list of available MBS services and identities of cells that are capable of providing the MBS services.

In a step 312, the first BS 110 may enquire if the UE 130 is interested in receiving MBS services. In some embodiments, the first BS 110 may send an enquiry message by an SIB or RRC signaling.

In a step 314, the UE 130 may respond to the enquiry from the first BS 110 with an interest indication. The interest indication may include for example one bit to indicate if or not the UE 130 is interested in receiving MBS services, and it does not need to include any specific MBS service even if the UE 130 is interested in receiving MBS services. It would be beneficial to minimize the uplink overhead. The interest indication may be sent to the first BS 110 by an RRC message. If the UE 130 is in the idle or inactive state, it may set up an RRC connection with the first BS 110 by a random access procedure before it sends the interest indication to the first BS 110.

If the UE 130 indicates no interest in receiving MBS services, the first BS 110 may proceed with a legacy dual connectivity setup or secondary node modification procedure. If the UE 130 indicates that it is interested in receiving MBS services, the first BS 110 may command the UE 130 to report interested MBS services in a step 320. As the UE 130 has set up the RRC connection with the first BS 110, the first BS 110 may send the command to report interested MBS services to the UE 130 by for example an RRC reconfiguration message. The command sent in the step 320 may be the same as or similar to the command sent in the step 220 of FIG. 2, and a repetitive description thereof would be omitted here.

In a step 330, the UE 130 may send information of one or more MBS services that the UE 130 is interested in to the first BS 110. The information of one or more interested MBS services may be sent by RRC signaling for example an RRC reconfiguration complete message, an MBS interest indication message or a measurement report. The step 330 may be the same as or similar to the step 230 in FIG. 2 and a detailed description thereof would be omitted here.

When the first BS 110 receives the information of one or more interested MBS services from the UE 130 in the step 330, the first BS 110 may initiate an SN addition or modification procedure to ensure that the UE 130 is able to receive the interested MBS services. In a step 340, the first BS 110 may send a SN addition or modification request to one of the neighboring second BSs 120 that is selected as the SN for the UE 130 or already operates as the SN of the UE 130. For example, if the UE 130 is not configured in the DC mode, the first BS 110 may select one of the neighboring second BSs 120 as the SN of the UE 130 based on the interested MBS services and measurement results received from the UE 130. In particular, the first BS 110 may select one of the neighboring second BSs 120 that has good (e.g., above a predetermined threshold) channel quality with the UE 130 and is able to provide the interested MBS services for the UE 130 as the SN of the UE 130. If the interested MBS services are not selected from the list of available MBS services and are currently unavailable at the neighboring second BSs 120, the first BS 110 may select the SN based on the measurement results, as in the legacy system. Then, the first BS 110 may send an SN addition request to the selected second BS 120 in the step 340 so as to add the second BS 120 as the SN for the UE 130.

In some embodiments, the UE 130 may be already in the DC configuration with the first BS 110 as the MN and one of the neighboring second BSs 120 as the SN, but the serving cells of the current SN cannot provide the one or more MBS services that the UE 130 is interested in. In such a case, the first BS 110 may decide to modify or change the current SN. In some embodiments, if the one or more interested MBS services may be provided for example by another cell of the current SN that is not included in the SCG 125, the first BS 110 may send in the step 340 an SN modification request to the one of the neighboring second BS 120 that acts as the current SN to add the another cell into the SCG 125 and, if necessary, to release one current serving cell in the SCG 125. In some embodiments, if the one or more interested MBS services are provided for example by one or more cells of an SN candidate (another neighboring second BS 120 different from the current SN), the first BS 110 may send in the step 340 an SN addition request to the SN candidate that provides the one or more interested MBS services to change the SN for the UE 130 from the current (source) SN to the (target) SN candidate.

In some embodiments, the SN addition or modification request may include information of the one or more interested MBS services received from the UE 130 in the step 330. For example, the information of the one or more interested MBS services may include a temporary mobile group identity (TMGI) of the interested MBS services. If the interested MBS services are selected from the list of available MBS services that are provided by cells of neighboring second BSs 120, the information of the one or more interested MBS services may also include identities of the cells that provide the interested MBS services. It would be appreciated that the SN addition or modification request may also include for example MCG configuration, UE capability, the latest measurement results for the SCG cell(s) or the like that are necessary for addition or modification of the SN and SN serving cells.

When the second BS 120, which is selected by the first BS 110 as the SN for the UE 130 or is operating as the SN of the UE 130, receives the SN addition or modification request, the second BS 120 may allocate or modify resources for the UE 130. The second BS 120 may decide at least a primary secondary cell (PSCell) for the UE 130. If one of cells of the second BS 120 can provide the interested MBS services included in the SN addition request or modification request, the second BS 120 may take the one of cells as the PSCell for the UE 130. If the interested MBS services include an MBS service that is not available at the second BS 120, the second BS 120 may register in a step 350 the MBS service for the UE 130 based on information of the unavailable MBS service received from the first BS 110. In some embodiments, the second BS 120 may register the MBS service in its PSCell 121. If the interested MBS services include an MBS service that is available at a SCell of the second BS 120, the second BS 120 may also register the MBS service in its PSCell 121. By doing so, all the interested MBS services may be provided from the PSCell 121 to the UE 130. In some embodiments, the second BS 120 may also register the unavailable MBS service in its SCell 123 so that the interested MBS services may be provided from the PSCell 121 and one or more SCells 123, respectively. It would be appreciated that in some embodiments the second BS 120 may not be able to provide all the interested MBS services to the UE 130.

Then in a step 360, the second BS 120 may send an SN addition or modification request acknowledgement to the first BS 110. The SN addition or modification request acknowledgement may include resource configuration of the second BS 120, and configuration of at least one of the one or more interested MBS services that the second BS 120 is able to provide. In some embodiments, the configuration of the at least one MBS service may include configuration of multicast control channel (MCCH) and multicast transport channel (MTCH) for the MBS service.

When the first BS 110 receives the SN addition or modification request acknowledgement from the second BS 120, the first BS 110 may forward the configuration of the second BS 120 and the configuration of the at least one of the one or more interested MBS services to the UE 130 in a step 370. For example, the configuration of the second BS 120 and the at least one interested MBS service may be sent by an RRC reconfiguration message. In some embodiments, the first BS 110 may also send an SN release request to the current SN of the UE 130 for handover from the current (source) SN to the new selected (target) SN.

Next, the UE 130 may apply the configuration of the second BS 120 to set up or modify connection with the second BS 120 in a step 380. For example, the UE 130 may be configured with a PSCell and optionally one or more SCells associated with the second BS 120 that provide the interested MBS services. For each serving cell (PSCell or SCell) of the second BS 120, the UE 130 may be configured with a bandwidth part(s) (BWP) that matches a frequency on which the MBS services are transmitted in the cell. Thus, the UE 130 is simultaneously connected to both the first BS 110 and the second BS 120. The first BS 110 operates as the MN for the UE 130, and the second BS 120 operates as the SN for the UE 130. In a step 390, the UE 130 may receive the least one of the one or more interested MBS services from the second BS 120 that acts as the SN for the UE 130, based on the configuration of the at least one of the one or more interested MBS services. The at least one MBS service may be transmitted by point to point (PTP) transmissions or point to multipoint (PTM) transmissions. As the UE 130 has received the configuration of the at least one interested MBS service, it does not need to decode SIBs related to the MBS service from the second BS 120. In the embodiments, MBS services are supported in the DC architecture. Even if the MN cannot provide any MBS service nor broadcast any MBS-related SIB, or the MN cannot provide the MBS service that the UE is interested in, the UE can receive MBS services from the SN.

FIG. 4 illustrates a flow chart of an example method 400 for supporting MBS services in the DC scenario in accordance with some example embodiments. For a better understanding, the below description of the method 400 may be read also with reference to FIGS. 1-3. The method 400 may be performed for example at a terminal device such as the UE 130.

As shown in FIG. 4, the example method 400 may include a step 410 of receiving from a first BS an enquiry about if the UE is interested in receiving MBS services, and a step 420 of, responsive to the enquiry, sending an interest indication indicative of whether the UE is interested in receiving MBS services to the first BS. For example, as discussed above with reference to the steps 312, 314 shown in FIG. 3, the UE 130 may receive the enquiry from the first BS 110, and send the interest indication to the first BS 110 in response to the enquiry. Details of the steps 410, 420 may refer to the steps 312, 314 shown in FIG. 3, respectively, and a repetitive description thereof is omitted here.

If the interest indication sent in the step 420 indicates that the UE is interested in receiving MBS services, the UE may receive a command to report interested MBS services from the first BS in a step 430. In some embodiments, the steps 410, 420 may be omitted, and the UE may indicate if it is interested in receiving MBS services or not by responding to the command. For example, If the UE is interested in receiving MBS services, it may respond to the command with a list of interested MBS services; If the UE is not interested in receiving any MBS service, it may respond to the command with an empty list or even not respond to the command. Details of the step 430 may refer to the above description with reference to the step 220 shown in FIG. 2 and the step 320 shown in FIG. 3, and a repetitive description is omitted here.

Continue referring to FIG. 4, the method 400 may include a step 440 of sending information of one or more interested MBS services to the first BS. As discussed above with reference to the step 230 shown in FIG. 2 and the step 330 shown in FIG. 3, the one or more interested MBS services may be selected from a list of MBS services available at a plurality of second BSs around the first BS and/or MBS services pre-configured in the communication system. Details of the step 440 may refer to the above description with reference to the step 230 in FIG. 2 and the step 330 in FIG. 3, and a repetitive description is omitted here.

At a step 450, the UE may receive from the first BS configuration of at least one of the one or more interested MBS services and configuration of a second BS that is capable of providing the at least one interested MBS service. As discussed above with reference to the step 270 shown in FIG. 2 and the step 370 shown in FIG. 3, the second BS may be one of secondary node (SN) candidates that is selected by the first BS as a new SN of the UE, and the configuration of the second BS is send to the UE for setting up dual connectivity (DC) at the UE; or the second BS may be the current SN of the UE, and the configuration of the second BS is sent to the UE for modification of the DC configuration at the UE. Details of the step 450 may refer to the above description with reference to the step 270 in FIG. 2 and the step 370 in FIG. 3, and a repetitive description is omitted here.

Then, the UE may set up or modify connection with the second BS based on the configuration of the second BS at a step 460. Thus, the UE is simultaneously connected to both the first BS and the second BS with the latest DC configuration. Details of the step 460 may refer to the above description with reference to the step 280 in FIG. 2 and the step 380 in FIG. 3, and a repetitive description is omitted here.

In the DC configuration, the UE can receive the at least one MBS service from the second BS based on the configuration of the at least one interested MBS service in a step 470. Thus, MBS services can be supported in the DC scenario even if the MN (the first BS) does not provide any MBS service nor broadcast any MBS-related system information block (SIB), or the MN cannot provide the MBS service that the UE is interested in. Details of the step 470 may refer to the above description with reference to the step 290 in FIG. 2 and the step 390 in FIG. 3, and a repetitive description is omitted here.

Figure 5:
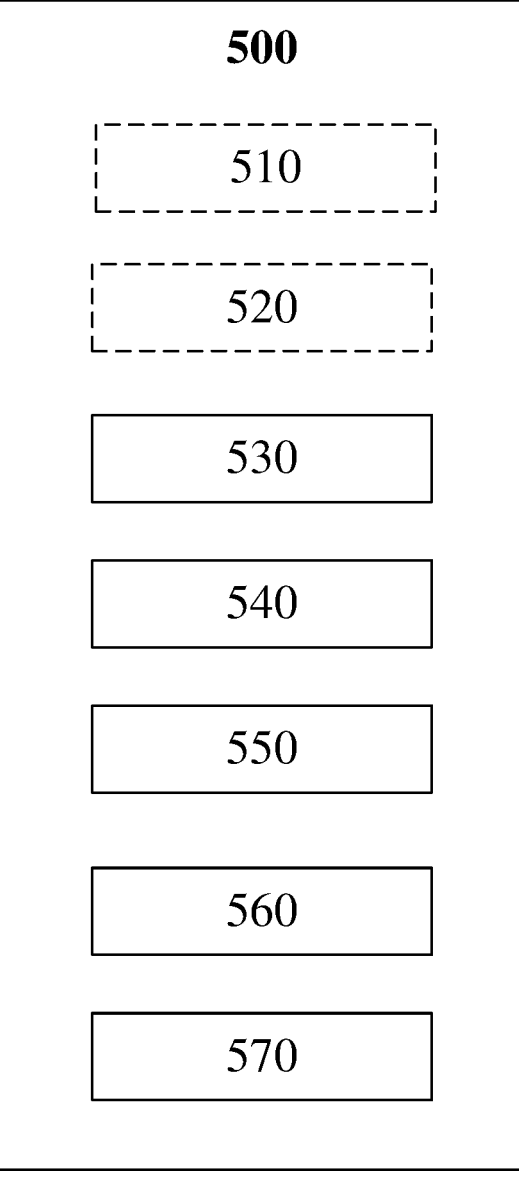
FIG. 5 illustrates a block diagram of an apparatus for supporting MBS services at a terminal device in accordance with some example embodiments.

FIG. 5 illustrates a block diagram of an example apparatus 500 in accordance with some example embodiments. The apparatus 500 may be implemented in for example the UE 130 to perform the method 400 shown in FIG. 4. Referring to FIG. 5, the apparatus 500 may include a first means (or module) 510 for performing the step 410, a second means 520 for performing the step 420, a third means 530 for performing the step 430, a fourth means 540 for performing the step 440, a fifth means 550 for performing the step 450, a sixth means 560 for performing the step 460, and a seventh means 570 for performing the step 470. In some embodiments, the first means 510 and the second means 520 are optional.

Figure 6:
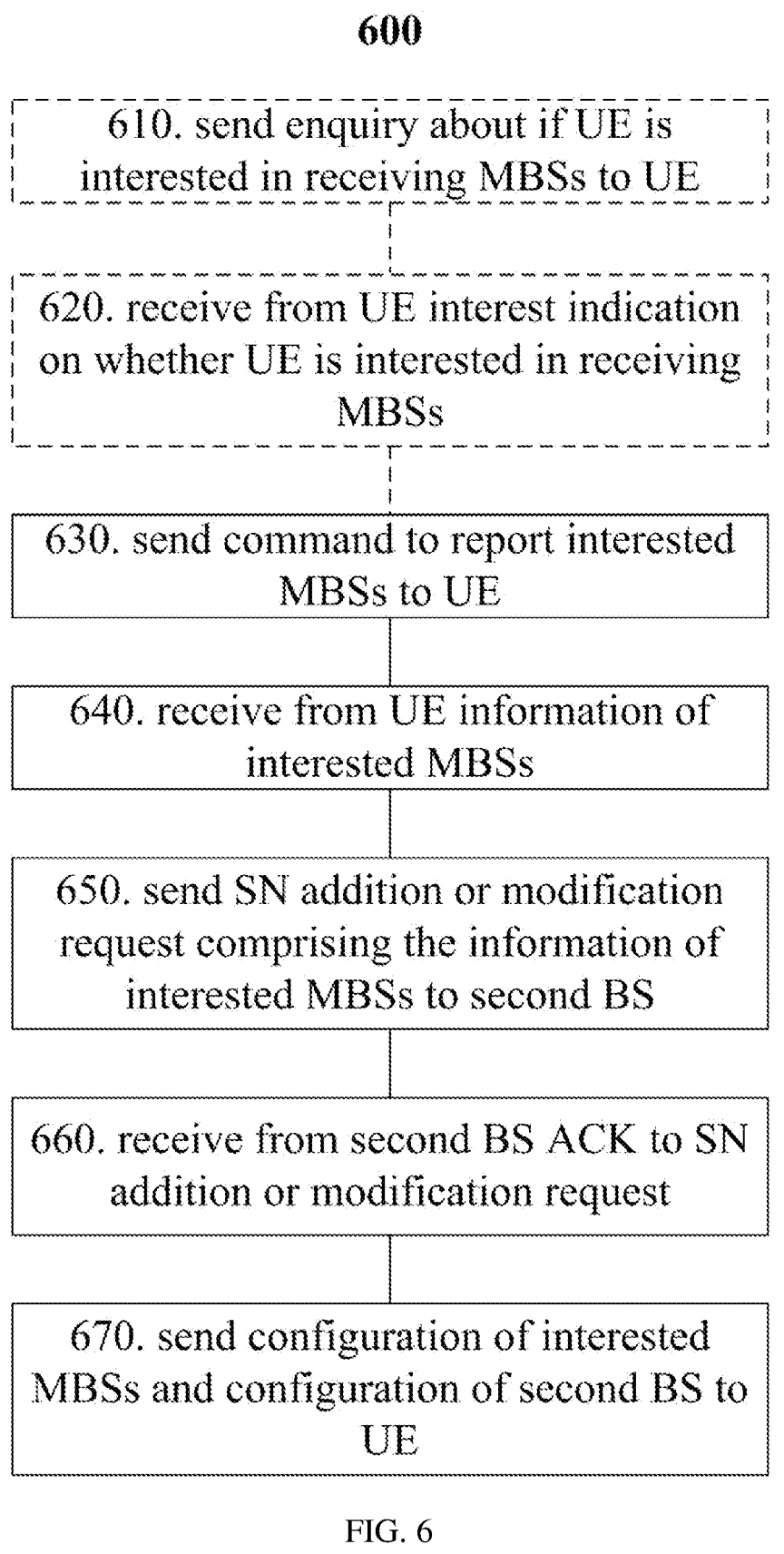

FIG. 6 illustrates a flow chart of an example method 600 for supporting MBS services in the DC scenario in accordance with some example embodiments. For a better understanding, the below description of method 600 may be read also with reference to FIGS. 2-5. The method 600 may be performed for example at a network device such as the first BS 110.

As shown in FIG. 6, the example method 600 may include a step 610 of sending to a UE an enquiry about if the UE is interested in receiving MBS services, and a step 620 of receiving from the UE an interest indication indicative of whether the UE is interested in receiving MBS services. Details of the steps 610, 620 may refer to the steps 312, 314 shown in FIG. 3, respectively, and a repetitive description thereof is omitted here.

In a case where the interest indication received from the UE indicates that the UE is interested in receiving MBS services, the first BS may command the UE to report interested MBS services in a step 630. In some embodiments, the first BS may collect available MBS services from neighboring second BSs before the step 630, and the command sent to the UE in the step 630 may or may not include a list of MSB services available to the UE. In some embodiments, the steps 610, 620 may be omitted, and instead the first BS can know the UE's interests in the MBS services from the UE's response to the command. Details of the step 630 may refer to the step 220 shown in FIG. 2 and the step 320 shown in FIG. 3, and a repetitive description thereof is omitted here.

In a step 640, the first BS may receive from the UE information of one or more MBS services that the UE is interested in. Based on the one or more interested MBS services, the first BS may select one of the neighboring second BSs as a secondary node (SN) for the UE. The selected SN may be a new SN for the UE, or the current SN of the UE. If the new SN is selected, the first BS would initiate a DC setup procedure if the UE is not configured in the DC mode or an SN change procedure if the UE is already configured in the DC mode. Details of the step 640 may refer to the step 230 shown in FIG. 2 and the step 330 shown in FIG. 3, and a repetitive description thereof is omitted here.

In a step 650, the first BS may send an SN addition or modification request comprising the information of one or more interested MBS services to a second BS that is selected as the SN of the UE. The SN addition or modification request may also include for example MCG configuration, UE capability and the like for the DC setup or SN change procedure. Details of the step 650 may refer to the step 240 shown in FIG. 2 and the step 340 shown in FIG. 3, and a repetitive description thereof is omitted here.

In a step 660, the first BS may receive from the second BS acknowledgement to the SN addition or modification request. The acknowledgement may include configuration of at least one of the one or more interested MBS services provided at the second BS and configuration of the second BS. In some embodiments, when the first BS receives the acknowledgement from the second BS that is selected as the new SN of the UE, the first BS, which operates as the MN of the UE, may send an SN release request to the current SN of the UE. Details of the step 660 may refer to the step 260 shown in FIG. 2 and the step 360 shown in FIG. 3, and a repetitive description thereof is omitted here.

Then in a step 670, the first BS may forward the configuration of the at least one of the one or more interested MBS services and the configuration of the second BS to the UE. The configuration of the second BS may be utilized at the UE to set up or modify connection with the second BS, and the configuration of the at least one MBS service may be utilized at the UE for receiving of the at least one MBS service from the second BS. Details of the step 670 may refer to the step 270 shown in FIG. 2 and the step 370 shown in FIG. 3, and a repetitive description thereof is omitted here.

Figure 7:
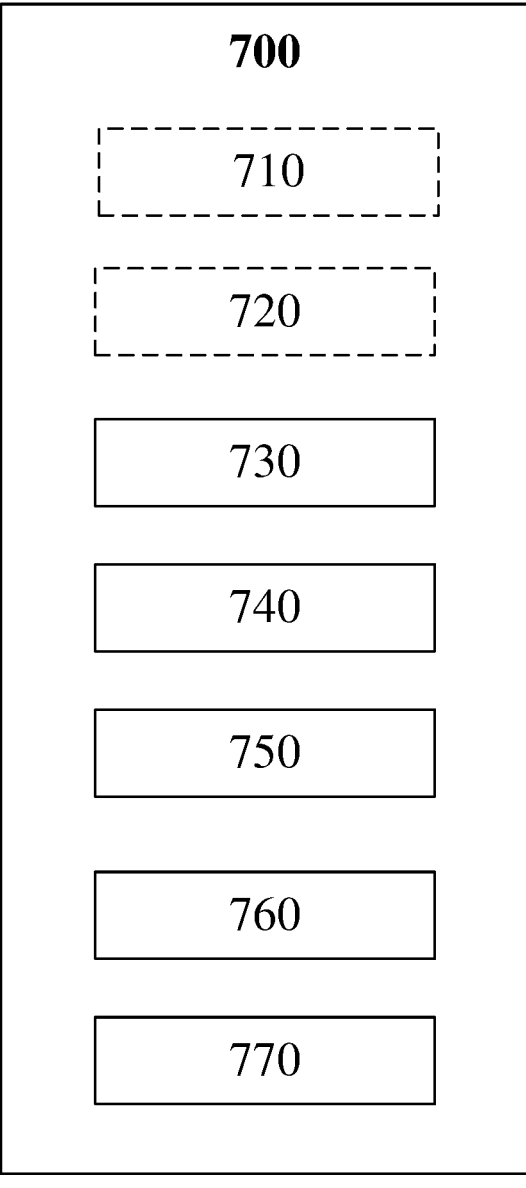
FIG. 7 illustrates a block diagram of an apparatus for supporting MBS services at a network device in accordance with some example embodiments.

FIG. 7 illustrates a block diagram of an example apparatus 700 in accordance with some example embodiments. The apparatus 700 may be implemented in for example the first BS 110 to perform the method 600 shown in FIG. 6. Referring to FIG. 7, the apparatus 700 may include a first means (or module) 710 for performing the step 610, a second means 720 for performing the step 620, a third means 730 for performing the step 630, a fourth means 740 for performing the step 640, a fifth means 750 for performing the step 650, a sixth means 760 for performing the step 660, and a seventh means 770 for performing the step 670.

Figure 8:
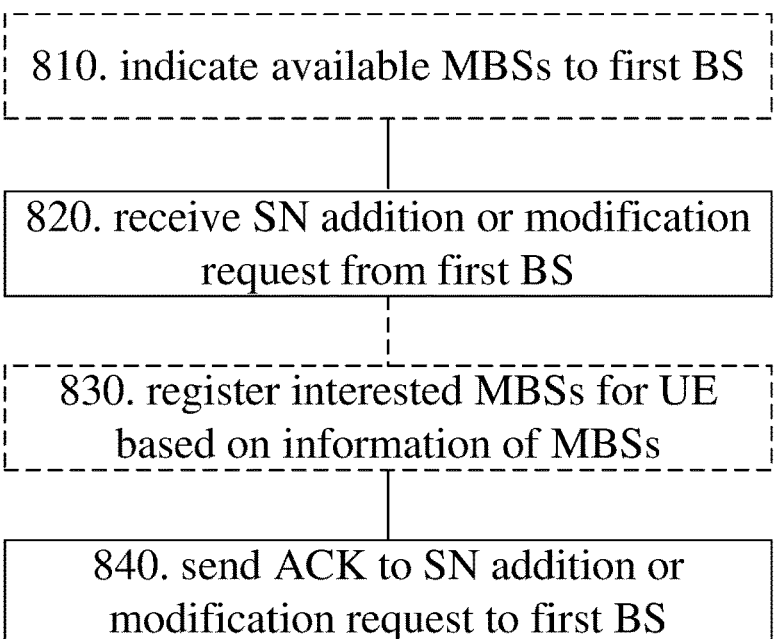
FIG. 8 illustrates a flow chart of a method for supporting MBS services at a network device in accordance with some example embodiments.

FIG. 8 illustrates a flow chart of an example method 800 for supporting MBS services in the DC scenario in accordance with some example embodiments. For a better understanding, the below description of method 800 may be read also with reference to FIGS. 2-7. The method 800 may be performed for example at a network device such as the second BS 120. The second BS 120 may operate as or be selected to operate as a secondary node of a terminal device such as the UE 130.

As shown in FIG. 8, the example method 800 may optionally include a step 810 of indicating MBS services available at the second BS to a first BS. For example, the second BS 120 may send information of available MBS services to the first BS 110 through an Xn interface. It would be understood that the first BS 110 may collect information of available MBS services from a plurality of neighboring second BSs 120. Details of the step 810 may refer to the step 210 shown in FIG. 2 and the step 310 shown in FIG. 3, and a repetitive description thereof is omitted here.

In a step 820, the second BS may receive an SN addition or modification request from the first BS. The SN addition or modification request may include information of one or more MBS services that a UE is interested in. The SN addition or modification request may also include for example MCG configuration, UE capability and/or UE capability coordination result, the latest measurement results for SCG cell(s) or the like for addition or modification of SN and SN serving cells. If the second BS is already configured as the SN of the UE, it receives an SN modification request in the step 820 to initiate an SN modification procedure. If the second BS is not configured as the SN of the UE but it is selected by the first BS as the SN of the UE, it receives an SN addition request in the step 820 to initiate an SN addition (setup or change) procedure. Details of the step 820 may refer to the step 240 shown in FIG. 2 and the step 340 shown in FIG. 3, and a repetitive description thereof is omitted here.

In some embodiments, if one or more of the interested MBS services received in the step 820 are currently unavailable at the second BS, the method 800 may further comprise a step 830 of registering the one or more interested MBS services at the second BS based on the information of the one or more interested MBS services. In some embodiments, the one or more interested MBS services may be registered in the PSCell of the second BS so that all the interested MBS services are provided from the PSCell of the second BS to the UE. In some embodiments, at least one interested MBS service may be registered in a SCell of the second BS so that the PSCell and one or more SCells of the second BS can provide MBS services to the UE. Details of the step 830 may refer to the step 250 shown in FIG. 2 and the step 350 shown in FIG. 3, and a repetitive description thereof is omitted here.

In a step 840, the second BS may send an SN addition or modification request acknowledgement to the first BS. The SN addition or modification request acknowledgement may comprise configuration of at least one of the one or more interested MBS services that the second BS provides and configuration of the second BS. The configuration of the second BS may include for example configuration of SCG radio resource allocated to the UE. Details of the step 840 may refer to the step 260 shown in FIG. 2 and the step 360 shown in FIG. 3, and a repetitive description thereof is omitted here.

It would be understood that the steps 810-840 of the method 800 may be performed at the second BS in cooperation with the steps 610-670 of the method 600 performed at the first BS and the steps 410-470 of the method 400 performed at the UE for supporting MBS services in the communication system 100 with the DC architecture as shown in FIG. 1. Thus, various features and aspects described above with reference to FIGS. 1-8 are also applicable to or included in the example methods 400, 600 and 800.

Figure 9:
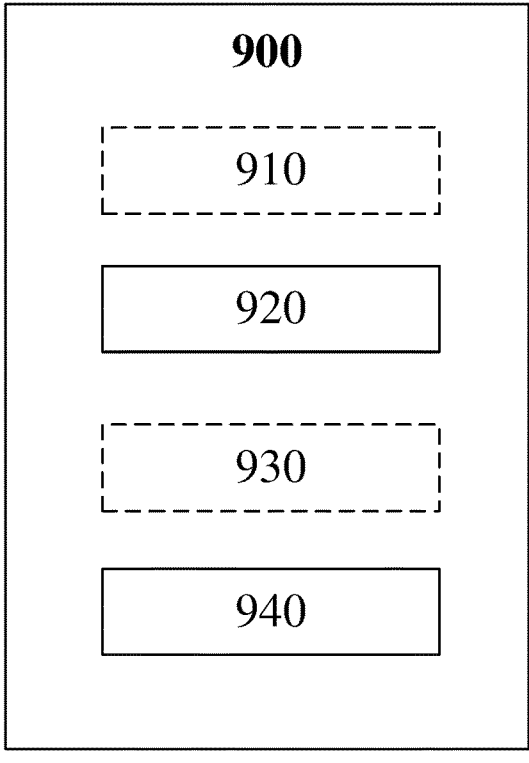
FIG. 9 illustrates a block diagram of an apparatus for supporting MBS services at a network device in accordance with some example embodiments.

FIG. 9 illustrates a block diagram of an example apparatus 900 in accordance with some example embodiments. The apparatus 900 may be implemented in for example the second BS 120 to perform the method 800 shown in FIG. 8. Referring to FIG. 9, the apparatus 900 may include a first means (or module) 910 for performing the step 810, a second means 920 for performing the step 820, a third means 930 for performing the step 830, and a fourth means 940 for performing the step 840.

Figure 10:
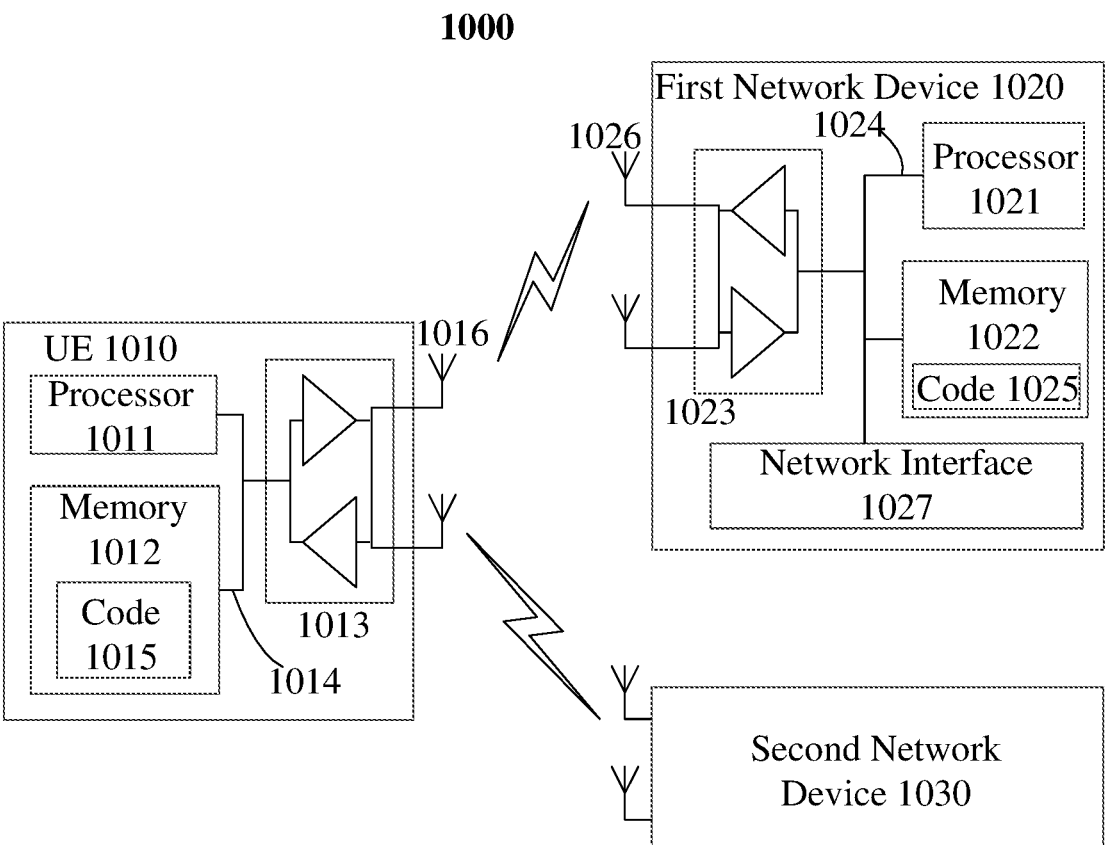
FIG. 10 illustrates a block diagram of an example communication system in which the example embodiments may be practiced.

FIG. 10 illustrates a block diagram of an example communication system 1000 in which embodiments of the present disclosure can be implemented. As shown in FIG. 10, the communication system 1000 may comprise a terminal device or UE 1010 which may be implemented as the UE 130 discussed above, a first network device 1020 which may be implemented as one of the first BS 110 and the second BS 120 discussed above, and a second network device 1030 which may be implemented as the other of the first BS 110 and the second BS 120 discussed above. The first network device 1020 and the second network device 1030 may have substantially the same structural blocks. For concision of the description, only blocks of the first network device 1020 are shown in FIG. 10 and detailed below, and a repetitive description of blocks in the second network device 1030 is omitted here.

Referring to FIG. 10, the UE 1010 may comprise one or more processors 1011, one or more memories 1012 and one or more transceivers 1013 interconnected through one or more buses 1014. The one or more buses 1014 may be address, data, or control buses, and may include any interconnection mechanism such as series of lines on a motherboard or integrated circuit, fiber, optics or other optical communication equipment, and the like. Each of the one or more transceivers 1013 may comprise a receiver and a transmitter, which are connected to one or more antennas 1016. The UE 1010 may wirelessly communicate with the network device 1020 and the network device 1030 through the one or more antennas 1016. When configured in the DC mode, the UE 1010 may receive and transmit data from and to the first network device 1020, the second network device 1030 simultaneously. The one or more memories 1012 may include computer program code 1015. The one or more memories 1012 and the computer program code 1015 may be configured to, when executed by the one or more processors 1011, cause the user equipment 1010 to perform processes and steps relating to the UE 130 as described above.

The first network device 1020 may comprise one or more processors 1021, one or more memories 1022, one or more transceivers 1023 and one or more network interfaces 1027 interconnected through one or more buses 1024. The one or more buses 1024 may be address, data, or control buses, and may include any interconnection mechanism such as a series of lines on a motherboard or integrated circuit, fiber, optics or other optical communication equipment, and the like. Each of the one or more transceivers 1023 may comprise a receiver and a transmitter, which are connected to one or more antennas 1026. The network device 1020 may operate as a base station for the UE 1010 and wirelessly communicate with the UE 1010 through the one or more antennas 1026. The one or more network interfaces 1027 may provide wired or wireless communication links through which the network device 1020 may communicate with other network devices, entities or functions. For example, the one or more network interfaces 1027 may include Xn or X2 interferences. The one or more memories 1022 may include computer program code 1025. The one or more memories 1022 and the computer program code 1025 may be configured to, when executed by the one or more processors 1021, cause the first network device 1020 to perform processes and steps relating to any one of the first BS 110 or the second BS 120 as described above. Similarly, one or more memories and computer program code stored in the memories of the second network device 1030 may be configured to, when executed by one or more processors 1021 of the second network device 1030, cause the second network device 1030 to perform processes and steps relating to the other of the first BS 110 and the second BS 120 as described above.

The one or more processors 1011, 1021 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 711, 721 may be configured to control other elements of the UE/network device and operate in cooperation with them to implement the procedures discussed above.

The one or more memories 1012, 1022 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 1012, 1022 may include but not limited to an electric, a magnetic, an optical, an electromagnetic, an infrared, or a semiconductor system, apparatus, or device or any combination of the above.

The first and second network devices 1020, 1030 may be implemented as a single network node, or disaggregated/distributed over two or more network nodes, such as a central unit (CU), a distributed unit (DU), a remote radio head-end (RRH), using different functional-split architectures and different interfaces.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing.

More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

What is claimed is:

1. A terminal device comprising:
at least one processor; and
at least one memory including computer program code, the at least one memory and the computer program code configured to, with the at least one processor, cause the terminal device to:
receive from a first network device a command to report interested multicast and broadcast services (MBSs);
send information of one or more interested MBS services to the first network device;
receive from the first network device configuration of at least one of the one or more interested MBS services and configuration of a second network device providing the at least one of the one or more interested MBS services;
set up or modify connection with the second network device based on the configuration of the second network device so that the terminal device is simultaneously connected to both the first network device and the second network device; and
receive the at least one of the one or more interested MBS services from the second network device based on the configuration of the at least one of the one or more interested MBS services.

2. The terminal device of claim 1 wherein the command comprises a list of MBS services available to the terminal device at one or more second network device candidates.

3. The terminal device of claim 2 wherein the command further comprises an identity of one or more cells served by the one or more second network device candidates.

4. The terminal device of claim 3 wherein when one or more of the interested MBS services are selected from the list of available MBS services provided by the one or more cells of the one or more second network device candidates, the information of the one or more interested MBS services sent to the first network device further comprises the identity of the one or more cells of the one or more second network device candidates.

5. The terminal device of claim 1 wherein the information of the one or more interested MBS services sent to the first network device comprises a temporary mobile group identity (TMGI) of the respective one or more interested MBS services.

6. The terminal device of claim 1 wherein the at least one memory and the computer program code are further configured to, with the at least one processor, further cause the terminal device to, before receiving the command:
receive from the first network device an enquiry about if the terminal device is interested in receiving MBS services; and
responsive to the enquiry, send an interest indication indicative of whether the terminal device is interested in receiving MBS services to the first network device, wherein the command to report interested MBS services is received from the first network device in a case where the interest indication indicates that the terminal device is interested in receiving MBS services.

* * * * *